(12) United States Patent
Kim (10) Patent No.: US 10,306,910 B2
(45) Date of Patent: Jun. 4, 2019

(54) JUICER

(71) Applicant: Young Ki Kim, Gyeongsangnam-do (KR)

(72) Inventor: Young Ki Kim, Gyeongsangnam-do (KR)

( * ) Notice: Subject to any disclaimer, the term of this patent is extended or adjusted under 35 U.S.C. 154(b) by 25 days.

(21) Appl. No.: 14/411,868

(22) PCT Filed: Jun. 27, 2013

(86) PCT No.: PCT/KR2013/005675
§ 371 (c)(1),
(2) Date: Dec. 29, 2014

(87) PCT Pub. No.: WO2014/003447
PCT Pub. Date: Jan. 3, 2014

(65) Prior Publication Data
US 2015/0164129 A1    Jun. 18, 2015

(30) Foreign Application Priority Data

Jun. 29, 2012  (KR) .................. 10-2012-0071162
Jun. 7, 2013   (KR) .................. 10-2013-0065189

(51) Int. Cl.
*A23N 1/02*     (2006.01)
*A47J 19/02*    (2006.01)

(52) U.S. Cl.
CPC .............. *A23N 1/02* (2013.01); *A47J 19/02* (2013.01); *A47J 19/025* (2013.01)

(58) Field of Classification Search
CPC ........ A47J 19/027; A47J 19/025; A47J 19/02; A47J 19/06; A47J 19/022; A23N 1/02; A23N 1/003; A23N 1/00
(Continued)

(56) References Cited

U.S. PATENT DOCUMENTS 4,614,153 A * 9/1986 Kurome ............... A47J 19/027
                                                   99/511
8,091,473 B2   1/2012 Kim
(Continued)

FOREIGN PATENT DOCUMENTS

CN       101683234 A    3/2010
CN       102362778 A    2/2012
(Continued)

OTHER PUBLICATIONS

International Search Report and Written Opinion from International Application No. PCT/KR2013/005675 dated Sep. 24, 2013.
(Continued)

*Primary Examiner* — Tu B Hoang
*Assistant Examiner* — Vy T Nguyen
(74) *Attorney, Agent, or Firm* — Alston & Bird LLP (57) ABSTRACT

The present invention relates to a juicer comprising a screw is arranged inside a net drum, and a rotary brush placed between an inner wall of a housing and an outer wall of the net drum, wherein a screw coupling protrusion or a screw coupling groove is formed on the upper part of the screw and a rotary brush coupling groove or a rotary brush coupling protrusion is formed on the upper part of the rotary brush such that the screw coupling protrusion and the rotary brush coupling groove are coupled or the screw coupling groove and the rotary brush coupling protrusion are coupled in such a manner that the rotary brush is directly rotated by the screw.

9 Claims, 7 Drawing Sheets

(58) Field of Classification Search
USPC .................................. 99/510, 513, 495, 511
See application file for complete search history.

(56) References Cited

U.S. PATENT DOCUMENTS

| | | | | |
|---|---|---|---|---|
| 2009/0049998 | A1* | 2/2009 | Kim | A47J 19/06 99/510 |
| 2012/0137899 | A1* | 6/2012 | Kim | A47J 19/027 99/509 |
| 2012/0266762 | A1* | 10/2012 | Wang | A47J 19/025 99/504 |
| 2012/0291638 | A1* | 11/2012 | Kim | A47J 19/027 99/501 |
| 2012/0325946 | A1* | 12/2012 | Charles | A47J 19/005 241/79 |
| 2013/0074708 | A1* | 3/2013 | Asbury | A23N 1/02 99/513 |
| 2013/0081547 | A1* | 4/2013 | Hu | A47J 19/025 99/495 |
| 2013/0284034 | A1* | 10/2013 | Jeong | A47J 19/025 100/117 |
| 2013/0327232 | A1* | 12/2013 | Charles | A23N 1/02 99/510 |
| 2014/0033934 | A1* | 2/2014 | Chou | A23N 1/02 99/501 |
| 2014/0053741 | A1* | 2/2014 | Chou | A47J 19/06 99/513 |
| 2014/0196614 | A1* | 7/2014 | Kim | A47J 19/025 99/513 |

FOREIGN PATENT DOCUMENTS

| | | | |
|---|---|---|---|
| CN | 202515359 U | 11/2012 | |
| CN | 202665184 U | 1/2013 | |
| KR | 10-0793852 | 9/2006 | |
| KR | 10-0755440 B1 | 9/2007 | |
| KR | 10-1038074 B1 | 6/2011 | |
| KR | 10-2011-0138108 A | 12/2011 | |
| KR | 10-2011-0138572 A | 12/2011 | |
| KR | 10-1101692 B1 | 12/2011 | |
| KR | 10-2012-0020879 | 3/2012 | |
| KR | 10-1154858 B1 | 3/2012 | |
| KR | 10-1181103 B1 | 9/2012 | |
| KR | 10-1257441 B1 | 4/2013 | |
| KR | 10-1365503 BI | 1/2014 | |
| WO | WO 2012/091235 A1 | 7/2012 | |
| WO | WO-2015192744 A1 * | 12/2015 | ............ A47J 19/025 |

OTHER PUBLICATIONS

Extended European Search Report for European Patent Application No. 13809457.8 dated Apr. 15, 2016, 6 pages.

Office Action for Chile Application No. 3476-14 dated Dec. 22, 2015, 16 pages total.

Office Action for Ukraine Application No. 2014 13840 dated Sep. 13, 2016, 7 pages total.

MOM's 2day (Brochure) [online] [retrieved Apr. 17, 2014]. Retrieved from the Internet: http://www.moms2day.co.kr/new/moms_view.php?p.code=P3554 (no date provided; no translation available), 11 pages.

* cited by examiner

JUICER

CROSS-REFERENCE TO RELATED APPLICATION

This Application is a Section 371 National Stage Application of International Application No. PCT/KR2013/005675, filed on Jun. 27, 2013, which claims priority from Korean Patent Application No. KR 10-2013-0065189, filed on Jun. 7, 2013, and from Korean Patent Application No. KR 10-2012-0071162, filed on Jun. 29, 2012, the contents of which are hereby incorporated by reference in their entireties.

BACKGROUND OF THE INVENTION

Technical Field

The present invention relates to a juicer, in which a rotary brush is configured to be directly rotated by a feed screw, thereby reducing the failure rate caused by breakage or abrasion of parts, such as gears, and which can be easily and simply assembled and used, and the parts of which can be washed easily and simply, thereby being always in a clean and hygienic condition, and which can easily discharge residue, thereby easily performing the juice extracting operation, and which prevents residue from contaminating juice, thereby improving the quality of juices.

Background Art

In recent years, as the interest in healthy living has increased and with the increased awareness of the harmfulness of various additives that are added to beverages, such as juice or soybean milk, many people have begun to prepare vegetable juice, fruit juice or grain juice at home from fresh vegetables, fruits or grains. Thus, juicers for making juices at home have been actively and continuously developed and put forward.

When continuously making juices using such conventional home juicers, residue is held in net holes of strainers of the juicers and inconveniences users when they are making the desired amount of juice. Further, to remove the residue from the net holes of the strainers, users are required to frequently disassemble the juicers and to wash out the disassembled parts of the juicers, which causes inconvenience. Further, the conventional home juicers do not allow highly viscous juices to easily flow down through the strainers which also inconveniences users.

In an effort to solve the above-mentioned problems, Korean Patent No. 0755440 (juice extractor) was proposed.

The document of the above-mentioned Korean patent discloses a patented invention characterized in that a rotary brush is installed in the juice extractor, in which the rotary brush continuously brushes the outer surface of the strainer so as to continuously remove the residue from the net holes of the strainer and to allow highly viscous juices to easily flow down through the strainer.

However, to rotate the rotary brush, the patented invention uses a complicated gear mechanism, in which a feed screw gear is formed in the lower part of a feed screw, an intermediate gear is installed on the bottom of a housing and a rotary brush gear is formed in the lower part of a rotary brush holder so that the gears can be rotated in a state in which they are engaged with each other.

When the juice extractor having the complicated gear mechanism is used for a lengthy period of time, various problems may occur as follows.

First, due to abrasion or breakage of the gears, the failure rate of the juice extractor increases. Further, in the juice extractor, the three kinds of gears must be assembled with each other in such a way that they can be rotated simultaneously in a state in which they are exactly and precisely engaged with each other, so that it is not easy to assemble the gears of the juice extractor.

Second, in food processing machines, such as juicers used to process food to make juices, the maintenance of cleanliness in the interior of the juicers where food comes into contact is very important. However, the patented invention is problematic in that, although dirt is held and accumulated in gaps between teeth of the gears, it is not easy to wash out the dirt from the gaps between the teeth of the gears.

Particularly, the intermediate gear that is fixed to the bottom of the housing cannot be disassembled from the housing so that it is impossible to remove the residue or dirt held in the gaps between the teeth of the gears, thereby causing serious problems for the maintenance of the cleanliness of the juice extractor.

Accordingly, in an effort to solve the above-mentioned problems, an improvement in the structure of the juice extractor which can avoid the geared rotating power transmission structure for rotating the rotary brush using gears and can efficiently operate the juice extractor has been continuously required.

DISCLOSURE

Technical Problem

Accordingly, the present invention has been made keeping in mind the above problems occurring in the related art, and the present invention is intended to propose a juicer, in which, by avoiding the use of a complicated geared rotating power transmission structure, the failure rate can be reduced and the assembly workability can be increased, thereby increasing the productivity and bringing about convenience to users, and the cleanliness and hygienic condition of the juicer can be improved, and residue can be easily discharged, thereby easily performing the juice extracting operation and realizing an improvement in the quality of juices, and a strainer and a rotary brush can be easily assembled with each other, thereby allowing a user to easily use the juicer.

Technical Solution

A juicer according to the present invention is characterized in that it includes: a main body having a rotating drive shaft in an upper part thereof; a housing vertically installed in the main body, the housing being open in an upper end thereof and being provided in a lower part thereof with a juice outlet and a residue outlet that are formed at respective locations spaced apart from each other; a lid installed to cover the open upper end of the housing and having a feed tube at a predetermined location in an upper part thereof; a strainer installed in the housing, the strainer being open in an upper end thereof and having a plurality of net holes in a part of a sidewall thereof; a rotary brush placed between an inner surface of the housing and an outer surface of the strainer, the rotary brush being open in upper and lower ends thereof and having a strainer brush configured to brush the outer surface of the strainer; and a feed screw having a drive shaft hole in a lower part thereof so as to receive the drive shaft of the main body through the drive shaft hole, the feed screw being rotatably installed on the main body at a location inside the strainer, with spiral blades formed on an outer surface of the feed screw, wherein the feed screw is provided with a feed screw locking protrusion or a feed screw locking groove in an upper end thereof, and the rotary brush is provided with a rotary brush locking groove or a rotary brush locking protrusion in an upper end thereof, wherein the feed screw locking protrusion and the rotary brush locking groove are engaged with each other or the feed screw locking groove and the rotary brush locking protrusion are engaged with each other, so, when the feed screw rotates, the rotary brush is rotated.

In an embodiment, the feed screw may be provided with a ring-shaped feed screw frame in the upper end, and the feed screw locking protrusion or the feed screw locking groove may be formed in a lower end of the feed screw frame.

In another embodiment, the rotary brush may be provided with a ring-shaped rotary brush frame in the upper end thereof, and the rotary brush locking groove or the rotary brush locking protrusion may be formed in an upper end of the rotary brush frame.

In a further embodiment, the rotary brush may include: a brush body being open in a part of a sidewall thereof; and a plurality of strainer brushes arranged on an inner surface of the brush body in such a way that the strainer brushes are inclined forward relative both to an upper end of the brush body and a rotating direction of the feed screw, thereby brushing the outer surface of the strainer.

In still another embodiment, a juicer according to the present invention is characterized in that it includes: a main body having a rotating drive shaft in an upper part thereof; a housing vertically installed in the main body, the housing being open in an upper end thereof and being provided in a lower part thereof with a juice outlet and a residue outlet that are formed at respective locations spaced apart from each other; a lid installed to cover the open upper end of the housing and having a feed tube at a predetermined location in an upper part thereof; a strainer installed in the housing, the strainer being open in an upper end thereof and having a plurality of net holes in a part of a sidewall thereof; a rotary brush placed between an inner surface of the housing and an outer surface of the strainer, the rotary brush being open in upper and lower ends thereof and having a strainer brush configured to brush the outer surface of the strainer; a ring-shaped rotary frame surrounding an upper part of the strainer and being seated on an upper end of the rotary brush; and a feed screw having a drive shaft hole in a lower part thereof so as to receive the drive shaft of the main body through the drive shaft hole, the feed screw being rotatably installed on the main body at a location inside the strainer, with spiral blades formed on an outer surface of the feed screw, wherein the feed screw is provided with a feed screw locking protrusion or a feed screw locking groove in an upper end thereof, and the rotary frame is provided with a first rotary frame locking groove or a first rotary frame locking protrusion in an upper end thereof, so that the feed screw locking protrusion and the first rotary frame locking groove are engaged with each other or the feed screw locking groove and the first rotary frame locking protrusion are engaged with each other, and the rotary frame is provided with a second rotary frame locking protrusion or a second rotary frame locking groove in a lower end thereof, and the rotary brush is provided with a rotary brush locking groove or a rotary brush locking protrusion in the upper end thereof, wherein the second rotary frame locking protrusion and the rotary brush locking groove are engaged with each other or the second rotary frame locking groove and the rotary brush locking protrusion are engaged with each other, so, when the feed screw rotates, both the rotary frame and the rotary brush are rotated.

A juicer according to the present invention is characterized in that it includes: a main body having a rotating drive shaft in an upper part thereof; a housing vertically installed in the main body, the housing being open in an upper end thereof and being provided in a lower part thereof with a juice outlet and a residue outlet that are formed at respective locations spaced apart from each other; a lid installed to cover the open upper end of the housing and having a feed tube at a predetermined location in an upper part thereof; a strainer installed in the housing, the strainer being open in an upper end thereof and having a plurality of net holes in a part of a sidewall thereof; a rotary brush placed between an inner surface of the housing and an outer surface of the strainer, the rotary brush being open in upper and lower ends thereof and having a strainer brush configured to brush the outer surface of the strainer; and a feed screw having a drive shaft hole in a lower part thereof so as to receive the drive shaft of the main body through the drive shaft hole, the feed screw being rotatably installed on the main body at a location inside the strainer, with spiral blades formed on an outer surface of the feed screw, wherein the feed screw is provided with an extension that extends in a radial direction relative to an upper rotating shaft formed in a center of an upper end of the feed screw, wherein the extension is combined with the rotary brush, so, when the feed screw rotates, the rotary brush is rotated.

In an embodiment, the extension of the feed screw may be provided with a feed screw locking protrusion or a feed screw locking groove, and the rotary brush may be provided with a rotary brush locking groove or a rotary brush locking protrusion in an upper end thereof, wherein the feed screw locking protrusion and the rotary brush locking groove may be engaged with each other or the feed screw locking groove and the rotary brush locking protrusion may be engaged with each other, so, when the feed screw rotates, the rotary brush is rotated.

In another embodiment, the extension of the feed screw may be provided with a ring-shaped feed screw frame, and the feed screw locking protrusion or the feed screw locking groove may be formed in a lower end of the feed screw frame.

In a further embodiment, the rotary brush may be provided with a ring-shaped rotary brush frame in the upper end thereof, and the rotary brush locking groove or the rotary brush locking protrusion may be formed in an upper end of the rotary brush frame.

In still another embodiment, the juicer of the present invention may further include: a ring-shaped rotary frame surrounding an upper part of the strainer and being seated on an upper end of the rotary brush, wherein the extension of the feed screw is provided with a feed screw locking protrusion or a feed screw locking groove, and the rotary frame is provided with a first rotary frame locking groove or a first rotary frame locking protrusion in an upper end thereof, so that the feed screw locking protrusion and the first rotary frame locking groove are engaged with each other or the feed screw locking groove and the first rotary frame locking protrusion are engaged with each other, and the rotary frame is provided with a second rotary frame locking protrusion or a second rotary frame locking groove in a lower end thereof, and the rotary brush is provided with a rotary brush locking groove or a rotary brush locking protrusion in the upper end thereof, wherein the second rotary frame locking protrusion and the rotary brush locking groove are engaged with each other or the second rotary frame locking groove and the rotary brush locking protrusion are engaged with each other, so, when the feed screw rotates, both the rotary frame and the rotary brush are rotated.

In still another embodiment, the rotary brush may include: a brush body being open in a part of a sidewall thereof; and a plurality of strainer brushes arranged on an inner surface of the brush body in such a way that the strainer brushes are inclined forward relative both to an upper end of the brush body and a rotating direction of the feed screw, thereby brushing the outer surface of the strainer.

In the juicer according to the present invention, a residue drop hole may be formed in the bottom of the housing such that the residue drop hole communicates with the residue outlet, wherein the lower end of the strainer is open, and the residue drop hole is configured to come into direct contact with the lower end surface of the feed screw.

In an embodiment, a residue discharge slope surface may be formed in an arc-shape on the bottom surface of the housing in such a way that the residue discharge slope surface starts at a predetermined position on the bottom surface and terminates at the residue drop hole, so the residue discharge slope surface guides residue to the residue drop hole according to rotation of the feed screw.

It is preferred that the residue discharge slope surface be configured in such a way that the depth becomes deeper and the width becomes wider as it goes to the residue drop hole.

In an embodiment, a circular discharge ring having a residue discharge step may be formed in the lower end surface of the feed screw such that the discharge ring faces the residue discharge slope surface.

In another embodiment, the rotary brush is configured such that the gap between the rotary brush and the outer surface of the strainer is constant from an upper part to a lower part thereof, so, when the strainer brush brushes the outer surface of the strainer, the strainer brush can brush the outer surface of the strainer over an area from the upper part to the lower part with even elasticity.

In a further embodiment, the rotary brush is configured such that the gap between the rotary brush and the outer surface of the strainer is reduced in a direction from the upper part to the lower part thereof, so, when the strainer brush brushes the outer surface of the strainer, the strainer brush can brush the lower part of the outer surface of the strainer with higher elasticity than the upper part.

It is preferred that the rotary brush have a shape that narrows in a direction from the upper end to the lower end thereof such that the outer diameter of the upper end of the strainer is larger than the inner diameter of the lower end of the rotary brush.

It is further preferred that the rotary brush have a shape that narrows in a direction from the upper end to the lower end thereof, so the strainer can be inserted into the rotary brush from the upper end of the rotary brush in such a way that the rotary brush surrounds the strainer from the upper end of the strainer.

Advantageous Effect

The juicer according to the present invention is advantageous as follows.

The feed screw is directly combined with the rotary brush to form a simple construction, so, when the feed screw rotates, the rotary brush can be rotated at the same time. Accordingly, the present invention can greatly reduce the number of parts that are assembled together to form the juicer, compared to the conventional juice extractor in which gears, such as the intermediate gear, are used to rotate the rotary brush.

Further, because the feed screw directly rotates the rotary brush, the present invention can avoid a complicated geared structure, so it can reduce the failure rate that may be caused by breakage or abrasion of parts, such as gears.

In addition, the parts constituting the juicer of this invention have simple shapes and structures instead of complicated shapes and structures, so the parts can be easily and simply assembled while avoiding difficulty that may be caused when assembling the parts of a conventional juice extractor in which the gears should be precisely assembled such that they can be precisely engaged with each other without being misaligned with each other, thereby bringing about convenience to users.

Further, the feed screw gear that is formed in the lower part of the feed screw, the intermediate gear that is installed on the bottom of the housing and the rotary brush gear that is formed in the lower part of the rotary brush holder are removed from the juicer of this invention, for which the parts of this juicer have simple shapes and simple structures, thereby allowing users to easily and simply wash the parts and always use the juicer under clean and hygienic conditions.

Particularly, in the present invention, the opposite ends of the feed screw are combined with the rotary brush, so it is possible to rotate the rotary brush with large torque.

Further, the shape of the strainer of the present invention narrows in the downward direction from the upper end to the lower end, and the outer diameter of the upper end of the strainer is larger than the inner diameter of the lower end of the rotary brush, so the rotary brush, the strainer and the feed screw can be sequentially assembled with each other by inserting the strainer into the rotary brush in the direction from the upper end to the lower end of the rotary brush, and by combining the feed screw with the drive shaft of the main body in the same direction. Thus, it is easy to assemble the parts of the juicer of this invention.

Further, residue that has been discharged through the open lower end of the strainer is discharged through the residue drop hole that is formed in the bottom surface of the housing and gets to directly face the lower end surface of the feed screw, so the present invention can easily discharge the residue and can easily extract juice. Further, because the residue drop hole gets to directly face the feed screw, the juicer of this invention does not require an additional pressurized discharge path. Accordingly, the present invention can prevent residue from contaminating juice through the pressurized discharge path, thereby improving the quality of juice.

The above-mentioned advantageous effects will be naturally realized by the construction of the invention regardless of whether the inventor knows the effects or not. Accordingly, it should be understood that the above-mentioned advantageous effects are only examples of expected effects of the present invention, not all effects that are expected by the inventor or actually exist. Thus, it is required to recognize additional advantageous effects of this invention from the description. Although some effects are not clearly disclosed in the description, if those skilled in the art appreciate

MODE FOR INVENTION

Hereinafter, the preferred embodiment of the present invention will be described in detail with reference to the accompanying drawings. The terminologies or words used in the description and the claims of the present invention should not be interpreted as being limited merely to their common and dictionary meanings. On the contrary, they should be interpreted based on the meanings and concepts of the invention in keeping with the scope of the invention based on the principle that the inventor(s) can appropriately define the terms in order to describe the invention in the best way.

It is to be understood that the form of the invention shown and described herein is to be taken as a preferred embodiment of the present invention, so it does not express the technical spirit and scope of this invention. Accordingly, it should be understood that various changes and modifications may be made to the invention without departing from the spirit and scope thereof.

Figure 1:
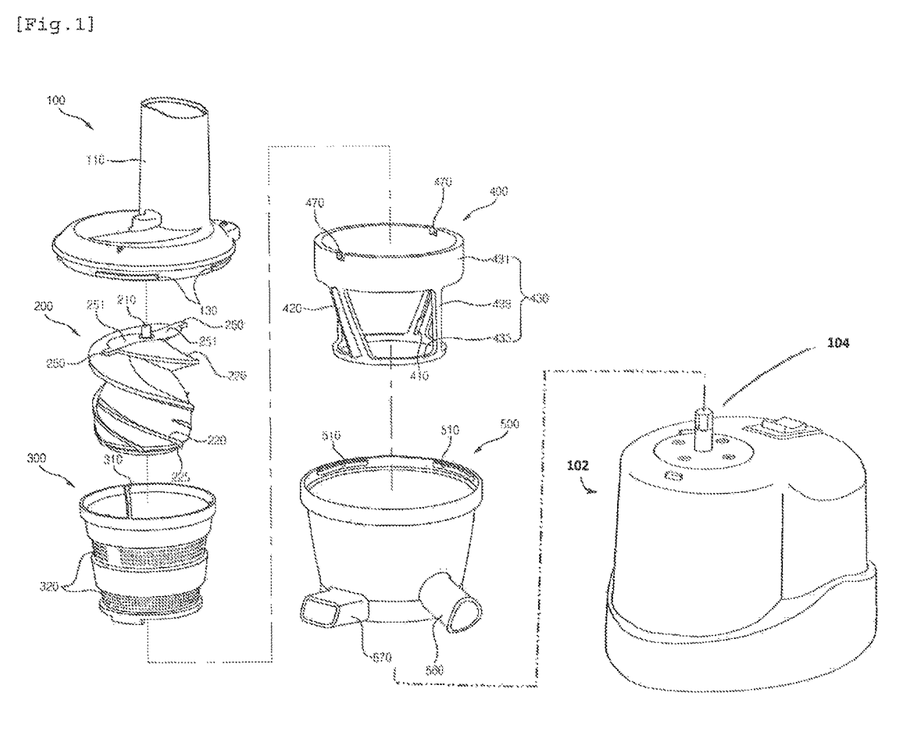
FIG. 1 is an exploded perspective view of a juicer according to a first embodiment of the present invention.

As shown in FIG. 1, a juicer according to the first embodiment of the present invention includes a lid 100, a feed screw 200, a strainer 300, a rotary brush 400, a housing 500 and a main body 102.

First, the main body 102 is well known to those skilled in the art by the patent document disclosed in the description of the related art. There is, in the upper part of the main body 102, a drive shaft 104 that protrudes upwards so as to be inserted into a drive shaft hole 230 of the feed screw 200. The configuration of the feed screw 200 will be described later herein.

The drive shaft 104 is connected to a motor (not shown) via a reduction gear (not shown), so that the drive shaft 104 can be rotated at a low speed. This drive shaft 104 is also coupled to a lower rotating shaft 240 of the feed screw 200 and rotates the feed screw 200 at a low speed. In other words, the reduction gear used in the present invention functions to reduce the rotating speed of the motor.

The housing 500 is vertically installed in the main body of the extractor and receives both the feed screw 200 and the strainer 300 therein. The upper end of this housing 500 is open and its upper part is wide, but its lower part is narrow so that the housing 500 has a shape that narrows in the downward direction.

The above-mentioned housing 500 is provided with a plurality of fastening protrusions 510 on the upper part of the inner circumferential surface thereof, with both a juice outlet 560 and a residue outlet 570 being formed on the lower part of the outer circumferential surface of the housing 500 at respective locations that are spaced apart from each other. The residue outlet 570 communicates with a residue drop hole 580 that is formed through the bottom of the housing 500. In this embodiment, both the juice outlet 560 and the residue outlet 570 have a tubular shape that is open in the front end thereof so that the juice outlet 560 and the residue outlet 570 can easily discharge juice and residue.

On the bottom surface of the housing 500, a residue discharge slope surface 590 (see FIG. 10) for guiding residue to the residue drop hole 580 by a rotation of the feed screw 200 which will be described later herein is formed. Further, in the center of the bottom of the housing 500, a waterproof cylinder 550 is formed by protruding upward, with a through hole 551 formed through the water proof tub 550, so the drive shaft 104 of the main body 102 passes through the through hole 551.

Figure 10:
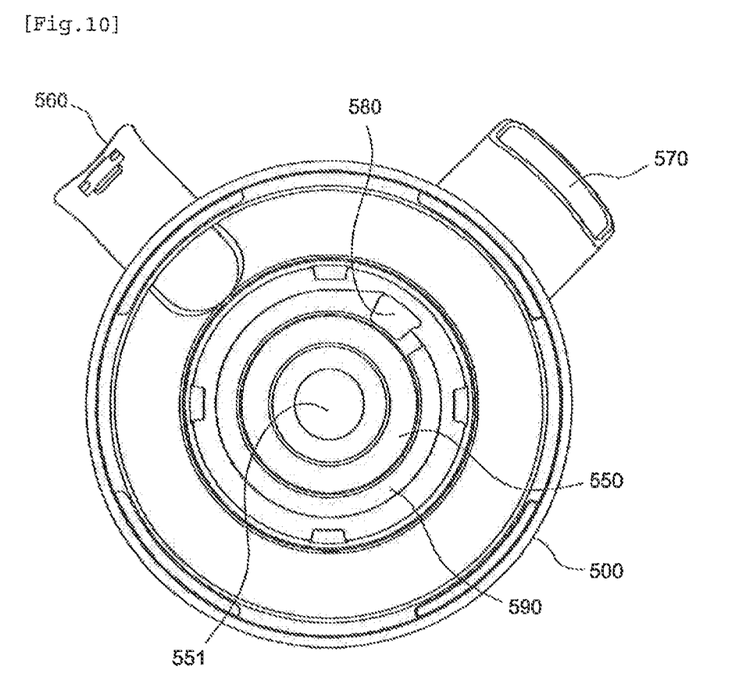
FIG. 10 is a plan view illustrating a housing of the present invention.

To realize efficient discharge of residue, the residue discharge slope surface 590 is formed in an arc-shape by extending from a predetermined position of the bottom surface of the housing 500 to the residue drop hole 580.

To further efficiently discharge the residue, the residue discharge slope surface 590 is configured in such a way that it becomes deeper and wider as it goes to the residue drop hole 580.

The lid 100 is configured in such a way that the lower part thereof is wide so as to cover the open upper end of the housing 500. The lower end of the lower part of the lid 100 is open. A cylindrical feed tube 110 is formed in a side portion of the upper surface of the lid 100 in such a way that the tube 110 protrudes upwards, so food can be put into the extractor. The upper end of the feed tube 110 is open, and the feed channel defined in the feed tube 110 is formed through the lid 100 so as to reach the open lower end of the lid 100.

A shaft hole 120 is formed in the central portion of the lower surface of the lid 100 so that an upper rotating shaft 210 of the feed screw 200 can be inserted into the shaft hole 120. Here, it is preferred that the shaft hole 120 be formed in the central portion of the lid 100, in which the feed tube 110 is formed at a location eccentric from the center portion having the shaft hole 120 by a predetermined distance, so the feed screw 200 can be efficiently rotated and food can be easily put into the extractor.

Further, a plurality of fastening ribs 130 protrude from a lower rim of the lid 100, with inclined surfaces (not shown) being formed on the lower surface of the lid 100 in such a way that the inclined surfaces are inclined in a rotating direction of the feed screw 200, so food can be automatically put into the extractor even when the food in the feed tube 110 is not being pressed.

Figure 3:
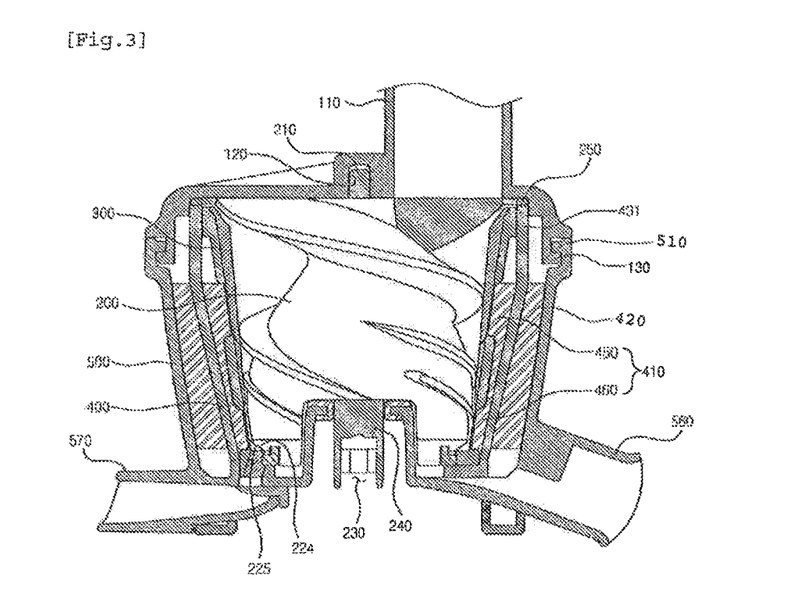
FIG. 3 is a sectional view illustrating the assembled state of the parts of FIG. 1.

As described above, the plurality of fastening ribs 130 protrude from the outer circumferential surface of the lower rim of the lid 100 and the plurality of fastening protrusions 510 are formed on the upper part of the inner circumferential surface of the housing 500, so the lid 100 can be removably fastened to the housing 500 by fastening the fastening ribs 130 to the fastening protrusions 510, as shown in FIG. 3.

The strainer 300 is installed in the housing 500, as shown in FIG. 3. Further, the strainer 300 is open in the upper end thereof and has a shape that narrows in the downward direction, as shown in FIG. 1.

That is, each of the strainer 300 and the rotary brush 400 is open in the upper and lower ends thereof and has a shape that narrows in a downward direction from the upper end to the lower end. Preferably, the outer diameter of the upper end of the strainer 300 is equal to or smaller than the inner diameter of the upper end of the rotary brush 400. Further, the outer diameter of the lower end of the strainer 300 is equal to or smaller than the inner diameter of the lower end of the rotary brush 400. Thus, to assemble the strainer 300 with the rotary brush 400, it is necessary to insert the strainer 300 downward into the rotary brush 400 from the upper end of the rotary brush 400. In the same manner as that described for the insertion of the strainer 300, the feed screw 200 should be inserted downward into the strainer 300 in a direction from the upper end of the strainer 300 to the lower end of the rotary brush 400. Accordingly, the rotary brush 400, the strainer 300 and the feed screw 200 are sequentially assembled in the same direction, in which the rotary brush 400 is inserted downward into the housing 500 from the open upper end of the housing 500, the strainer 300 is inserted downward into the rotary brush 400 from the open upper end of the rotary brush 400, and the feed screw 200 is inserted into the strainer 300 from the open upper end of the strainer 300, so it is easy to assemble the juicer.

The sidewall of the strainer 300 is formed by a net structure that allows juice extracted from squeezed food to pass therethrough. Here, because the sizes of pieces of squeezed food become smaller in a direction from top to bottom of the strainer, it is preferred that the sizes of net holes 320 become smaller in the direction from the top to the bottom of the strainer.

Further, food is finely ground at a middle height of the strainer 300, so, when the middle portion of the strainer 300 is configured to not be a net structure but a closed structure, it is possible to prevent the residue from being held in the strainer 300 or being introduced into the juice while passing through the net holes 320 during the grinding process. Thus, pure juice can be obtained.

Vertical wall blades 310 protrude from the inner surface of the strainer 300 at regular intervals. It is preferred that the wall blades 310 be divided into long and short blades. Further, it is preferred that the protruding height of each wall blade 310 be reduced in the direction from top to bottom so as to grind food into small pieces as the food is fed to the lower portion of the strainer 300 by the feed screw 200.

It is further preferred that a plurality of grinding blades (not shown) as well as the wall blades 310 protrude from the inner surface of the closed middle portion of the strainer 300.

In the above-mentioned strainer 300, food that has been fed to the middle portion along the vertical wall blades 310 is further finely ground in the middle portion having the plurality of grinding blades. For example, when making soybean milk using the extractor of this invention, part of the soybean milk is discharged from the strainer 300 to the outside through the upper net holes 320 and the remaining soybean milk is finely ground prior to being discharged from the strainer 300 to the outside through the lower net holes 320. In the above state, residue is discharged to the outside through the open lower end of the strainer.

Unlike the related art juice extractor (see Korean Patent No. 0793852) in which residue is discharged through a residue discharge hole that is formed in a part of a bottom ring of the lower end of the strainer and that is engaged with the residue drop hole of the housing so as to be operated in conjunction with the residue drop hole, the present invention is configured such that the lower end of the strainer 300 is open so as to discharge residue, so, when the parts of the juicer are completely assembled, as shown in FIG. 3 and FIG. 10, the residue drop hole 580 that is formed in the bottom of the housing 500 gets to directly face the lower end surface of the feed screw 200 that will be described later herein. Further, in addition to the direct contact of the residue drop hole 580 with the lower end of the feed screw 200, the residue discharge slope surface 590 is configured to come into direct contact with the lower surface of the feed screw 200. The present invention having the above-mentioned direct contact structure provides following advantages, compared to related art juice extractors.

In the related art juice extractor, the residue discharge hole is formed in the bottom ring provided at a location inside the lower end of the strainer, and it is required to assemble the strainer with the housing in such a way that the residue discharge hole can be operated in conjunction with the residue drop hole of the housing. Accordingly, in the related art juice extractor, residue should be discharged to the outside of the housing through the residue drop hole of the housing after passing through the residue discharge hole. Thus, residue remaining from specific food materials having long or tough cellulose may not easily pass through the residue discharge hole, so the related art juice extractor cannot easily discharge the residue and cannot easily make juice. Further, when the strainer is assembled with the housing, it is required to precisely align the residue discharge hole with the residue drop hole of the housing.

However, the present invention that is configured to discharge residue through the open lower end of the strainer 300 can avoid the above-mentioned problems.

Another advantage expected from the construction of the present invention resides in that the invention can make pure juices having no residue.

In the related art juice extractor (see Korean Patent No. 0793852), a pressurized discharge path is formed on the bottom surface of the housing at a location near the waterproof cylinder such that the pressurized discharge path is connected to the juice outlet. In the related art juice extractor, water (juice) that flows to a place near the waterproof cylinder 550 after passing over the bottom ring of the strainer, instead of being discharged to the outside of the strainer during a juice extracting process, may be discharged to the outside of the housing 500 through a gap between the through hole 551 and the drive shaft 104 after passing over the waterproof cylinder 550, so the juice may come into contact with the motor or the reduction gear of the main body 102 or may leak to the outer surface of the main body 102. The above-mentioned structure of the pressurized discharge path provided in the related art juice extractor is intended to solve the above-mentioned problems. However, the materials that flow to the place near to the waterproof cylinder after passing over the bottom ring of the strainer include part of the residue which is not discharged through the residue discharge hole, in addition to juice.

In this case, the residue collected in the place near the waterproof cylinder may flow through the pressurized discharge path and may be discharged through the juice outlet, thereby contaminating juice.

However, in the present invention, the residue discharge hole is removed from the strainer, and the residue drop hole 580 formed in the bottom of the housing 500 is configured to come into direct contact with the lower end surface of the feed screw 200, so water (juice) that flows to the place near the waterproof cylinder 550 can be easily discharged through the residue drop hole 580. Accordingly, unlike the related art juice extractor, the present invention does not require the pressurized discharge path that was provided in the related art juice extractor such that it can be operated in conjunction with the juice outlet 560 so as to discharge water (juice). Thus, the present invention can remove the possibility of residues contaminating juice, thereby producing pure, uncontaminated juice.

The rotary brush 400 is installed between the inner surface of the housing 500 and the outer surface of the strainer 300 and is open in the upper and lower ends thereof. This rotary brush 400 is configured to continuously brush both the inner surface of the housing 500 and the outer surface of the strainer 300 while rotating.

Here, it is preferred that the rotary brush 400 be fabricated using a brush body 430, a housing brush 420 and a strainer brush 410.

When designing the rotary brush 400, several modifications may be proposed on the basis of the viewpoint of the gap between the rotary brush and the outer surface of the strainer 300. For example, the rotary brush may be configured such that the gap between the rotary brush and the outer surface of the strainer is constant from the upper part to the lower part thereof. In this case, the strainer brush 410 is configured such that the width of a part of the strainer brush 410 which comes into contact with the upper part of the strainer 300 is almost equal to the width of a part of the strainer brush 410 which comes into contact with the lower part of the strainer, so, the strainer brush 410 can brush the outer surface of the strainer 300 over an area from the upper part to the lower part with even elasticity.

In another modification, the rotary brush 400 may be configured such that the gap between the rotary brush and the outer surface of the strainer is reduced in a direction from the upper part to the lower part thereof. In this case, the strainer brush 410 is configured such that the width of the part of the strainer brush 410 which comes into contact with the lower part of the strainer 300 is smaller than the width of the part of the strainer brush 410 which comes into contact with the upper part of the strainer, so, the strainer brush can brush the lower part of the outer surface of the strainer in which a larger amount of residue is produced than that of the upper part, with higher elasticity than the upper part.

Further, to make the width of the part of the strainer brush 410 which comes into contact with the lower part of the strainer 300 which requires to be brushed with stronger elasticity equal to or smaller than the width of the part of the strainer brush 410 which comes into contact with the upper part of the strainer the strainer 300, the rotary brush 400 narrows in a downward direction. Here, as shown in FIG. 1 and disclosed above, it is preferred that the juicer of this invention be configured such that, when assembling the juicer, the strainer 300 can be inserted into the rotary brush 400 from the upper end of the rotary brush 400 in a state in which the rotary brush 400 has been mounted to the housing 500, without allowing the rotary brush 400 to be fitted over the strainer 300 from the upper end of the strainer 300 so as to surround the outer surface of the strainer 300 in a state in which the rotary brush 400 has been mounted to the housing 500.

The upper part of the sidewall of the brush body 430 is closed, but the middle and lower parts of the brush body 430 are partially open.

The brush body 430 comprises a rotary brush frame 431, support ribs 433 and a connection rim 435.

The rotary brush frame 431 is a ring-shaped frame that is open in the upper and lower ends thereof and forms an upper end of the brush body 430.

The plurality of support ribs 433 are arranged at regular intervals. Here, the respective support ribs 433 are connected to the rotary brush frame 431 at their lower ends and are inclined so as to be tilted toward the feed screw 200 in the direction from top to bottom. In this embodiment, although four support ribs 433 are provided, the number of the support ribs is not limited to four.

The connection rim 435 is a ring-shaped part that is open in the upper end lower ends. The connection rim 435 connects the ends of the plurality of support ribs 433 to each other and forms the lower end of the brush body 430.

The support ribs 433 and the connection rim 435 partially open the sidewall of the brush body 430.

The housing brush 420 is arranged on the outer surface of the brush body 430 in such a way that it is inclined forward relative to both the upper part of the brush body 430 and the rotating direction of the feed screw 200.

Described in detail, the housing brush 420 is formed on the outer surface of a support rib 433 and extends along the support rib 433 in such a way that the housing brush 420 is inclined to approach the feed screw 200 in a direction from top to bottom and further protrudes outward as it moves in the direction from top to bottom, so the housing brush 420 can continuously brush the inner surface of the housing 500. In this embodiment, although the housing brush 420 is provided on each of two support ribs 433 that face each other, the number and locations of the housing brushes are not limited to the embodiment.

Because the housing brush 420 is arranged on the brush body in such a way that it is inclined forward relative to both the upper part of the brush body 430 and the rotating direction of the feed screw 200, as described above, food that is brushed by the housing brush 420 can easily flow down in a vertical direction.

The strainer brush 410 is arranged on the inner surface of the brush body 430 in such a way that it is inclined forward relative to both the upper part of the brush body 430 and the rotating direction of the feed screw 200.

In other words, the strainer brush 410 is formed on the inner surface of a support rib 433 and extends along the support rib 433 in such a way that the strainer brush 410 is inclined to come closer the feed screw 200 when proceeding in the direction from top to bottom, so the strainer brush 410 can continuously brush the outer surface of the strainer 300.

Because the strainer brush 410 is arranged in such a way that it is tilted forward relative to both the upper part of the brush body 430 and the rotating direction of the feed screw 200, as described above, food that is brushed by the strainer brush 410 can easily flow down in the vertical direction.

Here, it is preferred that, as shown in FIGS. 1 and 3, the strainer brush 410 comprises a filtering strainer brush 450 that functions to brush the upper net holes 320 of the strainer 300, and a compressive strainer brush 460 that functions to brush the lower net holes 320 of the strainer 300.

In this embodiment, although the filtering strainer brush 450 is connected to the compressive strainer brush 460, it should be understood that the filtering strainer brush 450 and the compressive strainer brush 460 may be arranged at locations spaced apart with respect to each other without being connected to each other. Further, the strainer brush 410 and the housing brush 420 may be integrated with each other into a single structure.

The upper rotating shaft 210 is formed in the center of the upper end of the feed screw 200, as shown in FIG. 1. This upper rotating shaft 210 is inserted into the shaft hole 120 of the lid 100 and executes a rotating motion. A plurality of spiral blades 220 are formed on the outer surface of the feed screw 200.

As shown in FIG. 3, the lower rotating shaft 240 having the drive shaft hole 230 is formed in the center of the lower end of the feed screw 200.

A discharge ring 224 is formed on the lower end surface of the feed screw 200 by protruding in a circular shape at a location at which the discharge ring 224 faces the residue discharge slope surface 590 when the feed screw 200 has been assembled in the housing 500. A residue discharge step 225 is formed on the surface of the discharge ring 224. The residue discharge step 225 guides residue, which has been collected on the bottom surface of the housing 500 after passing through the open lower end of the strainer 300, to the residue discharge slope surface 590 so as to allow the reside to be discharged through the residue drop hole 580.

Here, due to the residue discharge slope surface 590 that is formed in the housing 500, when the feed screw 200 is rotated by the drive shaft, residue that is placed in the gap between the lower end surface of the feed screw 200 and the bottom surface of the housing 500 can be easily fed to the residue drop hole 580. Further, the residue discharge slope surface 590 is configured such that it becomes deeper and wider as it goes to the residue drop hole 580, thereby easily moving the residue.

Further, it is preferred that the rotary brush 400 be configured to rotate and thereby to efficiently brush both the housing 500 and the strainer 300. To realize the rotatable structure, the rotary brush 400 is configured as follows.

Basically, in the present invention, to rotate the rotary brush 400, the rotation of the feed screw 200 can be directly transmitted to the rotary brush 400 by directly connecting the feed screw 200 to the rotary brush 400 instead of using gears.

As an example of a direct simple connection method for connecting the rotary brush 400 to the feed screw 200, a feed screw locking protrusion or a feed screw locking groove may be formed in the upper end of the feed screw 200, while a rotary brush locking groove or a rotary brush locking protrusion may be formed in the upper end of the rotary brush 400, as shown in FIG. 1, so that the feed screw locking protrusion can be engaged with the rotary brush locking groove or the feed screw locking groove can be engaged with the rotary brush locking protrusion, thereby allowing the rotary brush 400 to be rotated when the feed screw 200 rotates.

However, the above-mentioned direct connection method using both the locking groove and the locking protrusion is an example of methods of connecting the rotary brush 400 to the feed screw 200, so it should be understood that several different methods of directly connecting the feed screw 200 to the rotary brush 400 may be proposed.

Described in detail, in the embodiment shown in FIG. 1, an extension 251 is formed on the feed screw 200. In this embodiment, the extension 251 extends in a radial direction from the upper rotating shaft 210 that is formed in the center of the upper end of the feed screw 200, with a feed screw locking protrusion 250 formed in the end of the extension 251 by protruding radially outward. Here, the direct connection of the rotary brush 400 to the feed screw 200 may be sufficiently realized using at least one extension 251. However, to realize the rotating stability of both the feed screw 200 and the rotary brush 400, it is preferred that a plurality of extensions 251 be provided in such a way that the extensions 251 are angularly spaced apart from each other at regular intervals.

Here, it is preferred that a side surface of the extension 251 protrude outwards to form an arc-shaped protruding appearance. Particularly, when the extension 251 is arranged in diametrically opposite directions relative to the upper rotating shaft 210, diagonally opposite side surfaces of opposite arms of the extension 251 protrude outwards to form the arc-shaped protruding appearance. The extension 251 has a collateral function to primarily cut food that is being introduced into the strainer.

Further, a rotary brush locking groove 470 is formed in the upper end of the brush body 430 of the rotary brush 400. This groove 470 receives and is engaged with the feed screw locking protrusion 250. In this embodiment, two rotary brush locking grooves 470 are formed in the upper end of the rotary brush frame 431 of the brush body 430.

Figure 2:
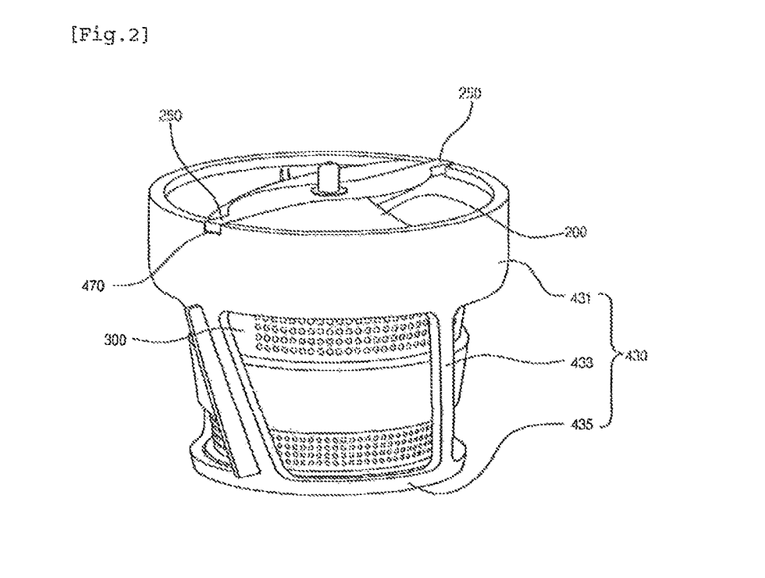
FIG. 2 is a perspective view illustrating an assembled state of a feed screw, a strainer and a rotary brush of FIG. 1.

Accordingly, when the feed screw locking protrusions 250 are inserted into and engaged with the rotary brush locking grooves 470 as shown in FIG. 2, the rotary brush 400 can be rotated when the feed screw 200 rotates.

Here, because the feed screw locking protrusions 250 formed in the end of the extension 251 are engaged with the rotary brush locking grooves 470 that are formed in the upper end of the rotary brush frame 431, the present invention is advantageous in that a large torque (rotating force) can be transmitted from the feed screw 200 to the rotary brush 400.

As described above, the present invention can rotate the rotary brush 400 in response to the rotation of the feed screw 200 while utilizing a simple construction that is formed both by the rotary brush locking groove 470 and by the feed screw locking protrusion 250, so this invention is advantageous in that it can remarkably reduce the number of parts that must be assembled together in the juicer, compared to conventional juicers or extractors using a gear mechanism having, for example, intermediate gears that rotate the rotary brush 400.

Further, the present invention is configured in such a way that the rotary brush 400 can be directly rotated using the feed screw 200, so this invention does not use a complicated gear mechanism and, accordingly, efficiently reduces the failure rate caused by breakage or abrasion of parts, such as gears.

Further, in this invention, the parts have simple shapes and structures instead of complicated shapes and structures, so the juicer of this invention can be easily and simply assembled while avoiding the difficulty that may occur when assembling the parts of a conventional juice extractor in which gears should be precisely assembled so as to be precisely engaged with each other without being misaligned, thereby bringing about convenience to users.

Further, the gear that is formed in the lower part of the feed screw, the intermediate gear that is fixed to the bottom of the housing and the gear that is formed in the lower part of the rotary brush holder are removed from the juicer of this invention, so the parts of this juicer have simple shapes and structures, thereby allowing users to easily and simply wash the parts and to always use the juicer in clean and hygienic conditions.

Further, unlike the related art juice extractor in which residue passes through a residue discharge hole formed in the strainer, the present invention can discharge the residue from the strainer 300 through the wide open lower end of the strainer 300 prior to discharging the residue to the outside of the extractor through the residue drop hole 580. Thus, even when making juices using specific food materials having long or tough cellulose, the present invention can easily discharge residue and can easily make juices.

Further, unlike the related art juice extractor in which, to realize the communication of the residue discharge hole with the residue drop hole, the housing and the strainer should be precisely aligned with each other, the present invention can easily and quickly assemble the strainer with the housing without paying careful attention to the angular directions of the two parts, thereby bringing about convenience to users.

Further, the present invention does not form a conventional pressurized discharge path in the extractor, thereby making pure juices having no residue.

Figure 4:
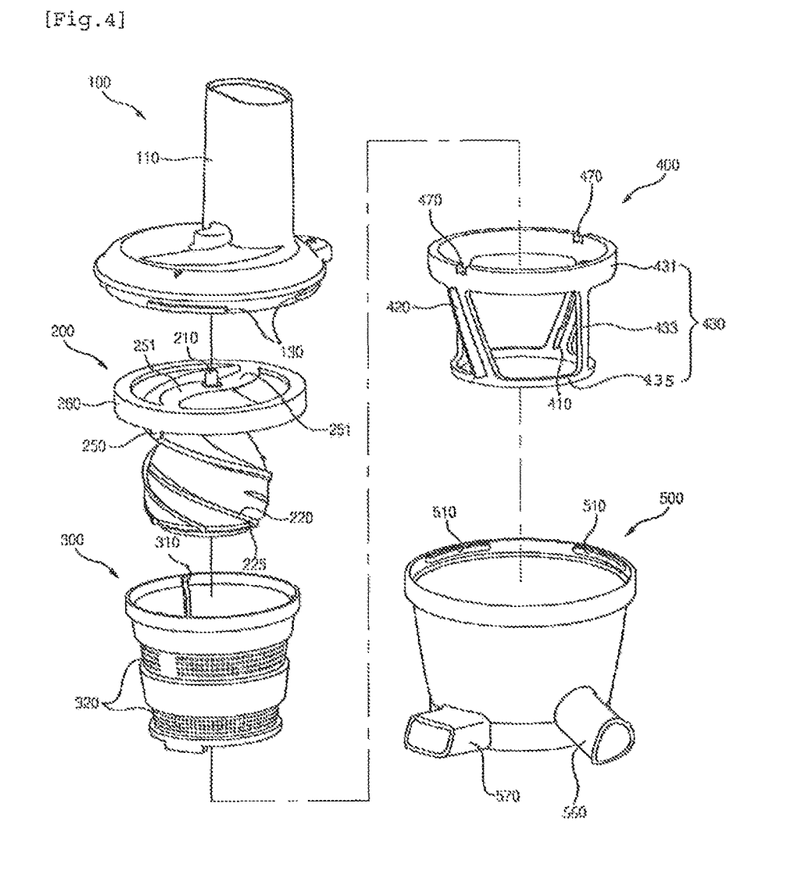
FIG. 4 is an exploded perspective view illustrating a juicer according to a second embodiment of the present invention.
Figure 5:
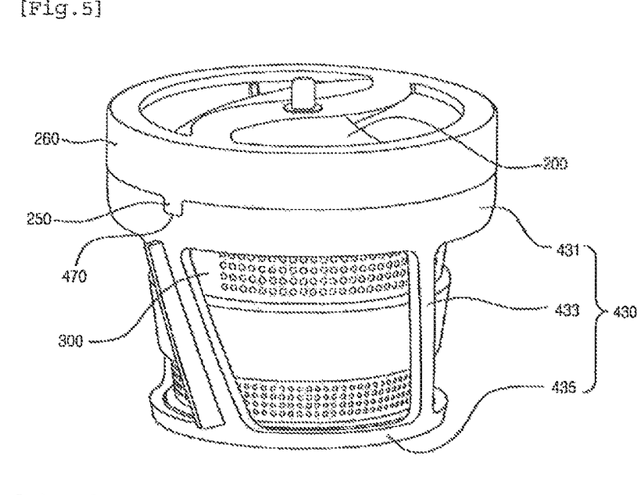
FIG. 5 is a perspective view illustrating an assembled state of a feed screw, a strainer and a rotary brush of FIG. 4.
Figure 6:
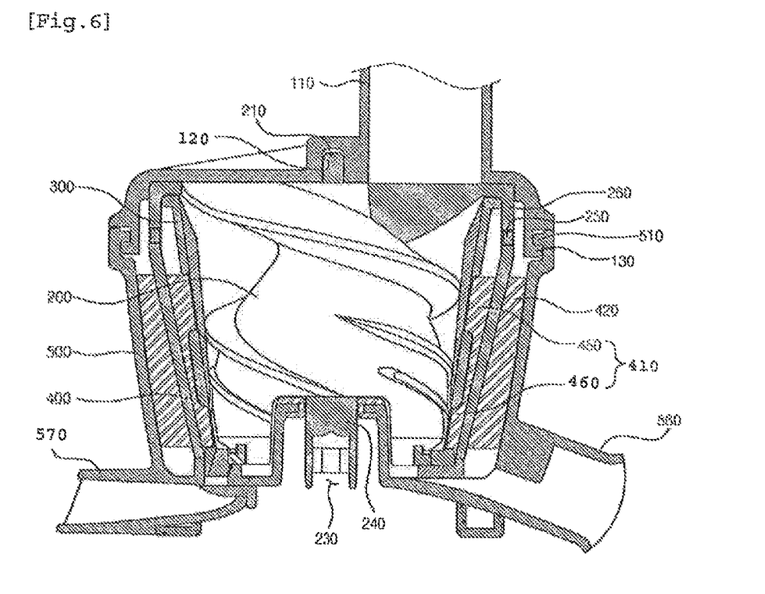
FIG. 6 is a sectional view illustrating the assembled state of the parts of FIG. 4.

Another embodiment of this invention which has a construction allowing the rotary brush 400 to be rotated when the feed screw 200 rotates is shown in FIGS. 4 through 6.

As shown in FIG. 4, in this embodiment, a ring-shaped feed screw frame 260 is provided in the upper part of the feed screw 200.

In other words, the ring-shaped feed screw frame 260 is formed in such a way that it is connected to opposite ends of the extension 251, with a feed screw locking protrusion 250 protruding downwards from the lower end of the feed screw frame 260.

The ring-shaped feed screw frame 260 having the above-mentioned construction is seated on the upper end of the rotary brush frame 431 of the brush body 430, as shown in FIGS. 5 and 6, and, in the above state, the feed screw locking protrusion 250 is engaged with the rotary brush locking groove 470, so the rotary brush 400 can be rotated when the feed screw 200 rotates.

Figure 7:
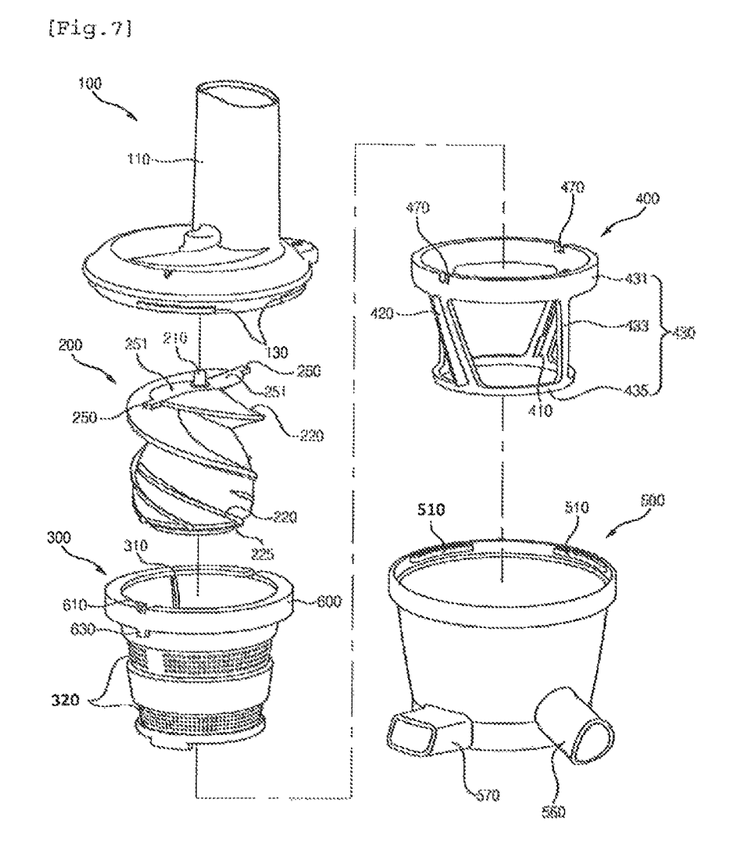
FIG. 7 is an exploded perspective view illustrating a juicer according to a third embodiment of the present invention.
Figure 8:
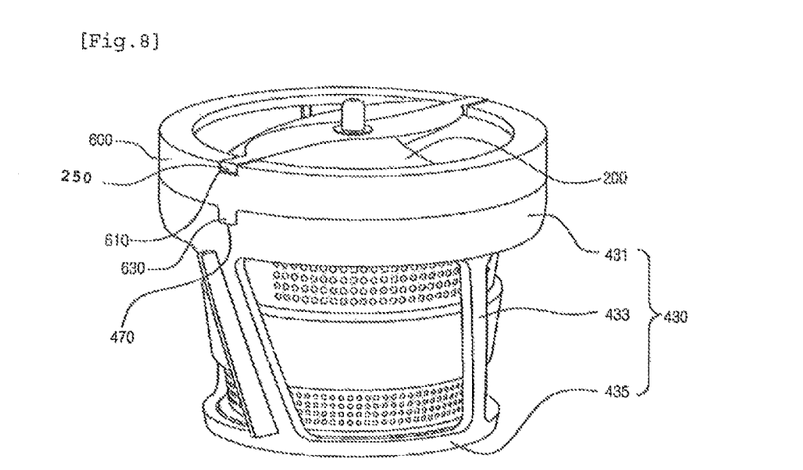
FIG. 8 is a perspective view illustrating an assembled state of a feed screw, a strainer and a rotary brush of FIG. 7.
Figure 9:
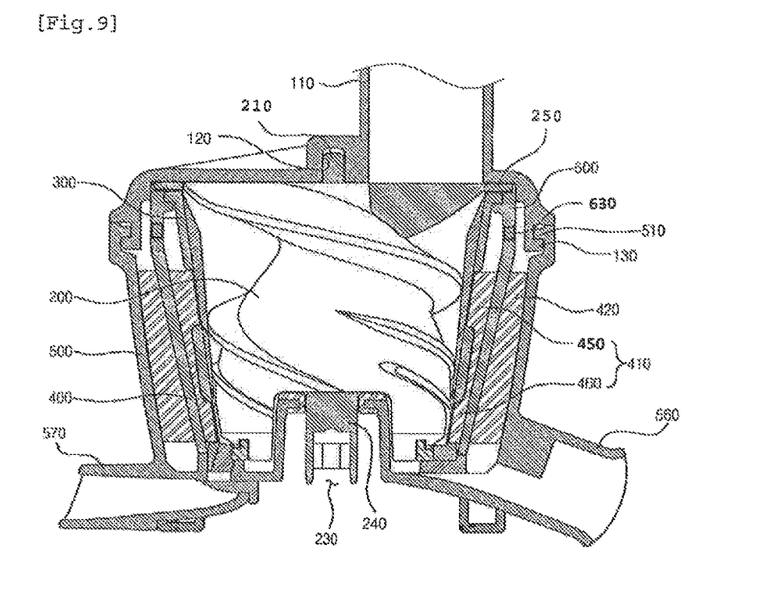
FIG. 9 is a sectional view illustrating the assembled state of the parts of FIG. 7.

A further embodiment of this invention which has a construction allowing the rotary brush 400 to be rotated when the feed screw 200 rotates is shown in FIGS. 7 through 9.

As shown in FIG. 7, a rotary frame 600 is a ring-shaped frame that surrounds the upper part of the strainer 300. Here, the lower end of the rotary frame 600 is seated on the upper end of the rotary brush 400, as shown in FIG. 8.

A feed screw locking protrusion or a feed screw locking groove is formed in the upper end of the feed screw 200, and a first rotary frame locking groove or a first rotary frame locking protrusion is formed in the upper end of the rotary frame 600, so the feed screw locking protrusion and the first rotary frame locking groove may be engaged with each other or the feed screw locking groove and the first rotary frame locking protrusion may be engaged with each other.

Further, a second rotary frame locking protrusion or a second rotary frame locking groove is formed in the lower end of the rotary frame 600, and a rotary brush locking groove or a rotary brush locking protrusion is formed in the upper end of the rotary brush 400, so the second rotary frame locking protrusion and the rotary brush locking groove may be engaged with each other or the second rotary frame locking groove and the rotary brush locking protrusion may be engaged with each other, thereby allowing both the rotary frame 600 and the rotary brush 400 to be rotated when the feed screw 200 rotates.

In this embodiment, an extension 251 extends from the upper rotating shaft 210 in opposite directions relative to the upper rotating shaft 210 that is provided in the center of the upper end of the feed screw 200, with a feed screw locking protrusion 250 being formed on each end of the extension 251 such that it protrudes outwards.

The rotary frame 600 in the shape of a ring is provided outside the upper part of the strainer 300, in which the outer surface of the rotary frame 600 protrudes outwards by a length greater than that by which the strainer 300 protrudes outwards. Here, the rotary frame 600 is arranged around the strainer 300 in such a way that the inner surface of the rotary frame 600 is spaced apart from the outer surface of the strainer 300 by a predetermined distance.

A rotary frame locking groove 610 is formed in the upper end of the rotary frame 600 so that the feed screw locking protrusion 250 can be inserted into and engaged with rotary frame locking groove 610. Further, a rotary frame locking protrusion 630 is formed in the lower end of the rotary frame 600 such that it protrudes downwards.

A rotary brush locking groove 470 is formed in the upper end of the brush body 430 of the rotary brush 400 so that the rotary frame locking protrusion 630 can be inserted into and engaged with the rotary brush locking groove 470.

Accordingly, as shown in FIGS. 8 and 9, the feed screw locking protrusion 250 is inserted into and engaged with the rotary frame locking groove 610, and the rotary frame 600 is seated on the upper end of the rotary brush frame 431 of the brush body 430. In the above state, the rotary frame locking protrusion 630 is engaged with the rotary brush locking groove 470, so both the rotary frame 600 and the rotary brush 400 can be rotated when the feed screw 200 rotates.

Due to the rotary frame 600 that is seated on the upper part of the rotary brush 400 as described above, it is possible to seal the upper part of the rotary brush 400, thereby preventing juice from leaking to the outside of the strainer 300.

Hereinbelow, the operation of the above-mentioned juicer according to the embodiment of the present invention will be described.

The operation will be described with reference to FIG. 3. When food is put into the feed tube 110 of the lid 100, the food is guided into the strainer 300 while being guided by the inclined surfaces that are formed on the lower surface of the lid 100 while being pushed by a rotation of the feed screw 200.

The food that has been guided into the strainer 300 is forcibly fed downwards due to both the rotation of the feed screw 200 and the operation of the vertical wall blades 310 and, in the above state, the food is gradually finely ground, compressed and squeezed. During this process, juice that has been extracted from the food flows to the outside of the strainer 300 through the net holes 320 formed in the sidewall of the strainer 300 and is discharged to the outside of the extractor through the juice outlet 560.

The residue that has reached the open bottom of the strainer 300 due to the rotation of the feed screw 200 is pushed by the residue discharge step 225 that is formed on the discharge ring 224 of the lower end surface of the feed screw 200, and is guided by the residue discharge slope surface 590, and passes through the residue drop hole 580 prior to being discharged to the outside of the juicer through the residue outlet 570.

Juice that has been produced during the process in which food is being forcibly fed along the vertical wall blades 310 of the strainer 300 flows to the outside of the strainer through the net holes 320 that are formed in the upper part at positions above the closed middle portion of the strainer. Further, juice that has been produced during the process in which the food is being finely ground inside the inner surface of the closed middle portion having the plurality of grinding blades can flow outwards through the net holes 320 that are formed at locations below the closed middle portion, and is, thereafter, discharged to the outside of the extractor through the juice outlet 560.

Further, both the feed screw 200 and the strainer 300 are vertically assembled and operated in the housing 500, so this invention increases the speed with which food is fed downwards compared to the conventional juice extractor in which both the feed screw and the strainer are horizontally assembled and operated. Further, this invention allows juice that has been collected in the housing 500 to easily flow downwards without stagnating in the housing 500.

Although a preferred embodiment of the present invention has been described for illustrative purposes, those skilled in the art will appreciate that various modifications, additions and substitutions are possible, without departing from the scope and spirit of the invention as disclosed in the accompanying claims.

| (Description of reference characters of important parts) | |
|---|---|
| 100: lid | 110: feed tube |
| 120: shaft hole | 130: fastening rib |
| 200: feed screw | 210: upper rotating shaft |
| 220: spiral blade | 224: discharge ring |
| 225: residue discharge step | |
| 230: drive shaft hole | 240: lower rotating shaft |
| 250: feed screw locking protrusion | |
| 251: extension | 260: feed screw frame |
| 300: strainer | 310: vertical wall blade |
| 320: net hole | 400: rotary brush |
| 410: strainer brush | 420: housing brush |
| 430: brush body | 431: rotary brush frame |
| 433: support rib | 435: connection rim |
| 470: rotary brush locking groove | |
| 500: housing | 510: fastening protrusion |
| 550: waterproof cylinder | 551: through hole |
| 560: juice outlet | 570: residue outlet |
| 580: residue drop hole | |
| 590: residue discharge slope surface | |
| 600: rotary frame | |
| 610: rotary frame locking groove | |
| 630: rotary frame locking protrusion | |

What is claimed is:

1. A juicer, comprising:
   a main body having a rotating drive shaft in an upper part thereof;
   a housing vertically installed in the main body, the housing being open in an upper end thereof and being provided in a lower part thereof with a juice outlet and a residue outlet that are formed at respective locations spaced apart from each other;
   a lid installed to cover the open upper end of the housing and having a feed tube at a predetermined location in an upper part thereof and a shaft hole formed at a lower surface of the lid;
   a strainer installed in the housing, the strainer being open in an upper end thereof and having a plurality of net holes in a part of a sidewall thereof;
   a rotary brush placed between an inner surface of the housing and an outer surface of the strainer, the rotary brush being open in upper and lower ends thereof and having a strainer brush configured to brush the outer surface of the strainer; and
   a feed screw having a drive shaft hole in a lower part thereof so as to receive the drive shaft of the main body through the drive shaft hole, and an upper rotating shaft formed at an upper end of the feed screw and configured to be inserted into the shaft hole, the feed screw being rotatably installed on the main body at a location inside the strainer, with spiral blades formed on an outer surface of the feed screw, wherein
   the strainer is stationary between the feed screw and the rotary brush,
   the feed screw defines an extension disposed on the upper rotating shaft formed at the upper end of the feed screw that extends in a radial direction relative to an axis of rotation of the upper rotating shaft across an upper end of the strainer, wherein the extension is configured to engage the feed screw to the rotary brush across the strainer such that rotation of the feed screw directly controls rotation of the rotary brush,
   wherein the extension of the feed screw is provided with a feed screw locking protrusion or a feed screw locking groove,
   wherein the rotary brush is provided with a rotary brush locking groove or a rotary brush locking protrusion in an upper end thereof, and
   wherein the feed screw locking protrusion and the rotary brush locking groove are engaged with each other or the feed screw locking groove and the rotary brush locking protrusion are engaged with each other such that when the feed screw rotates, the rotary brush is rotated.

2. The juicer as set forth in claim 1, wherein the rotary brush comprises:
   a brush body being open in a part of a sidewall thereof; and
   a plurality of strainer brushes arranged on an inner surface of the brush body in such a way that the strainer brushes are inclined forward relative both to an upper end of the brush body and a rotating direction of the feed screw, thereby brushing the outer surface of the strainer.

3. The juicer as set forth in claim 1, wherein
   a residue drop hole is formed in the bottom of the housing such that the residue drop hole communicates with the residue outlet, wherein
   the lower end of the strainer is open, and the residue drop hole gets to directly face a lower end surface of the feed screw.

4. The juicer as set forth in claim 3, wherein
   a residue discharge slope surface is formed in an arc-shape on a bottom surface of the housing in such a way that the residue discharge slope surface starts at a predetermined position on the bottom surface and terminates at the residue drop hole, so the residue discharge slope surface guides residue to the residue drop hole according to rotation of the feed screw, and the residue discharge slope surface is configured in such a way that it becomes deeper and wider as it goes to the residue drop hole.

5. The juicer as set forth in claim 4, wherein
   a circular discharge ring having a residue discharge step is formed in the lower end surface of the feed screw such that the discharge ring faces the residue discharge slope surface.

6. The juicer as set forth claim 1, wherein
   the rotary brush is configured such that a gap between the rotary brush and the outer surface of the strainer is constant from an upper part to a lower part thereof, so, when the strainer brush brushes the outer surface of the strainer, the strainer brush can brush the outer surface of the strainer over an area from the upper part to the lower part with even elasticity.

7. The juicer as set forth in claim 1, wherein
   the rotary brush is configured such that a gap between the rotary brush and the outer surface of the strainer is reduced in a direction from an upper part to a lower part thereof, so, when the strainer brush brushes the outer surface of the strainer, the strainer brush can brush the lower part of the outer surface of the strainer with higher elasticity than the upper part.

8. The juicer as set forth in claim 1, wherein
the rotary brush has a shape that narrows in a direction from an upper end to a lower end thereof such that an outer diameter of the upper end of the strainer is larger than an inner diameter of the lower end of the rotary brush, and such that the strainer can be inserted into the rotary brush from the upper end of the rotary brush, without allowing the rotary brush to be fitted over the strainer from the upper end of the strainer so as to surround the outer surface of the strainer.

9. A juicer comprising:
a main body having a rotating drive shaft in an upper part thereof;
a housing vertically installed in the main body, the housing being open in an upper end thereof and being provided in a lower part thereof with a juice outlet and a residue outlet that are formed at respective locations spaced apart from each other;
a lid installed to cover the open upper end of the housing and having a feed tube at a predetermined location in an upper part thereof;
a strainer installed in the housing, the strainer being open in an upper end thereof and having a plurality of net holes in a part of a sidewall thereof;
a rotary brush placed between an inner surface of the housing and an outer surface of the strainer, the rotary brush being open in upper and lower ends thereof and having a strainer brush configured to brush the outer surface of the strainer; and
a feed screw having a drive shaft hole in a lower part thereof so as to receive the drive shaft of the main body through the drive shaft hole, the feed screw being rotatably installed on the main body at a location inside the strainer, with spiral blades formed on an outer surface of the feed screw, wherein
the strainer is stationary between the feed screw and the rotary brush,
the feed screw is provided with a feed screw locking protrusion or a feed screw locking groove in an upper end thereof, and
the rotary brush is provided with a rotary brush locking groove or a rotary brush locking protrusion in an upper end thereof, wherein
the feed screw locking protrusion and the rotary brush locking groove are engaged with each other or the feed screw locking groove and the rotary brush locking protrusion are engaged with each other with the upper end of the feed screw crossing an upper end of the strainer such that rotation of the feed screw directly controls rotation of the rotary brush.

* * * * *